United States Patent [19]

Greer

[11] Patent Number: 4,524,791

[45] Date of Patent: Jun. 25, 1985

[54] BRAKE FOR AWNING ASSEMBLY

[75] Inventor: Bradley G. Greer, Irvine, Calif.

[73] Assignee: A & E Systems, Inc., Santa Ana, Calif.

[21] Appl. No.: 572,404

[22] Filed: Jan. 20, 1984

[51] Int. Cl.³ .......................... B60T 1/02; E06B 9/208

[52] U.S. Cl. .................................... 135/89; 188/82.2; 160/305

[58] Field of Search .................. 160/305, 306, 66, 67, 160/291, 294; 188/82.2, 82.3, 82.34, 82.84; 135/88, 89

[56] References Cited

U.S. PATENT DOCUMENTS

| | | | |
|---|---|---|---|
| 135,461 | 2/1872 | Alling | 188/82.3 |
| 1,286,818 | 12/1918 | Snyder | 188/82.84 |
| 3,870,096 | 3/1975 | Horrell | 160/305 |
| 3,918,510 | 11/1975 | Hayward | 135/89 |

FOREIGN PATENT DOCUMENTS

| | | | |
|---|---|---|---|
| 32820 | 12/1884 | Fed. Rep. of Germany | 188/72.7 |
| 2110780 | 6/1983 | United Kingdom | 188/82.2 |

*Primary Examiner*—Richard J. Johnson
*Attorney, Agent, or Firm*—Ellsworth R. Roston; Charles H. Schwartz

[57] ABSTRACT

Apparatus is provided for controlling the positioning of an awning relative to a recreational vehicle. The apparatus includes a rotary shaft and a roller mounted on the shaft in concentric relationship with the shaft for rotation with the shaft. An annular cap and a brake member are also mounted on the shaft at one end of the shaft in concentric relationship with the shaft. The brake member may be disposed within the cap. A control member such as a eccentric is disposed on the shaft in eccentric relationship with the cap and is rotatable to first, second and third positions. The eccentric is disposed in the first position in cooperative relationship with the brake member to provide for a rotation of the brake member in a first direction for winding the awning on the roller and to inhibit the brake member against rotation in a second direction for unwinding the awning from the roller. The eccentric is disposed in the second position in cooperative relationship with the brake member to provide for a rotation of the brake member in the second direction for unwinding the awning from the roller and to inhibit the brake member from rotating in the first direction. The eccentric may be disposed in the third position in displaced relationship from the brake member to provide for a rotation of the brake member in the first and second directions.

13 Claims, 8 Drawing Figures

6
72
98
88
92
22
20
82
40
80
70
28
74
56
42
6
14
46
32
34

92
72
98
22
96
86
88
82
74
70
80

BRAKE FOR AWNING ASSEMBLY

This invention relates to apparatus for use on a recreational vehicle for providing a controlled winding and unwinding of an awning from a vehicle. The invention particularly relates to apparatus for providing a controlled winding of the awning on a roller to any desired position relative to the recreational vehicle or for providing a controlled unwinding of the awning from the roller to any desired position.

Awnings are generally attached to the sides of recreational vehicles. The awnings are generally unwound from the recreational vehicles when the recreational vehicles have reached a desired location. When the awning is unwound, it provides an extension of the recreational vehicle and provides the occupants of the recreational vehicle an opportunity to have shade while they are relaxing outside of the motor vehicle. The awnings are rewound and attached to the side of the motor vehicle when the occupants desire to travel to a new location.

The awnings now in use generally have certain disadvantages. They are cumbersome and require considerable effort to be operated satisfactorily. Furthermore, mechanisms for locking the awning in the desired position and for unlocking the awning for movement to a new position are generally located at the opposite lateral ends of the awning. Since the awnings are quite wide and since the locking mechanisms are generally at the lateral extremities of the awnings, the occupants of the recreational vehicles have had to move from side to side of the awning in order to operate the laterally disposed mechanisms for locking the awning or for unlocking the awning.

U.S. Pat. No. 3,870,096 issued to Robert E. Horrell on Mar. 11, 1975, discloses an arrangement for overcoming some of the problems discussed above. The locking arrangement disclosed in U.S. Pat. No. 3,870,096 is disposed at only one lateral end of the awning so that it can be operated conveniently by a single occupant of the motor vehicle. Furthermore, the locking mechanism can be operated in a first position to provide for an unwinding of the awning from the vehicle while preventing the awning from being wound and can be operated in a second position to provide for a winding of the awning while preventing the awning from being unwound.

In the locking mechanism of U.S. Pat. No. 3,870,096, a hollow drum is rotatable with a roller for winding an awning on the roller or unwinding the awning from the roller. An eccentric is mounted on the drum and is rotatable in a first direction for locking the drum and the roller against the winding of the awning on the roller and is rotatable in a second direction for locking the drum and the roller against the unwinding of the awning from the roller.

There are certain problems which exist in the structure of the locking mechanism of U.S. Pat. No. 3,870,096. One disadvantage is that the mechanism is relatively complex. Because the mechanism is relatively complex, it is not always reliable. Furthermore, the locking occurs by an engagement between an eccentric and the inner surface of a drum. Since the drum has a relatively great diameter in comparison to the diameter of the eccentric, the eccentric sometimes becomes tightly bound against the eccentric so that it is difficult to move the eccentric to different positions.

This invention provides a locking mechanism for an awning on a recreational vehicle. The locking mechanism of this invention is quite simple but reliable. It provides for an easy operation of the mechanism by a single occupant of the recreational vehicle and allows this occupant to roll the awning on the roller or unwind the awning from the roller after he has operated the mechanism. The locking mechanism cannot be jambed even when it is operated to the different positions with great force.

In one embodiment of the invention, apparatus is provided for controlling the positioning of an awning relative to a recreational vehicle. The apparatus includes a rotary shaft and a roller mounted on the shaft in concentric relationship with the shaft for rotation with the shaft. An annular cap and a brake member are also mounted on the shaft at one end of the shaft in concentric relationship with the shaft. The brake member may be disposed within the cap.

A control member such as an eccentric is disposed on the shaft in eccentric relationship with the cap and is rotatable to first, second and third positions. The eccentric is disposed in the first position in cooperative relationship with the brake member to provide for a rotation of the brake member in a first direction for winding the awning on the roller and to inhibit the brake member against rotation in a second direction for unwinding the awning from the roller. The eccentric is disposed in the second position in cooperative relationship with the brake member to provide for a rotation of the brake member in the second direction for unwinding the awning from the roller and to inhibit the brake member from rotating in the first direction. The eccentric may be disposed in the third position in displaced relationship from the brake member to provide for a rotation of the brake member in the first and second directions.

The apparatus of this invention is adapted to be used with an awning in a recreational vehicle to control the winding of the awning on a roller or the unwinding of the awning from the roller. The construction of the awning apparatus may correspond to that disclosed in U.S. Pat. No. 4,117,878 issued to me on Oct. 3, 1978, for an "Awning For A Mobile Home" or in U.S. Pat. No. 4,188,964 issued to me on Feb. 19, 1980, for a "Travel Awning". Both of these patents are assigned of record to the assignee of record of this application.

Figure 1:
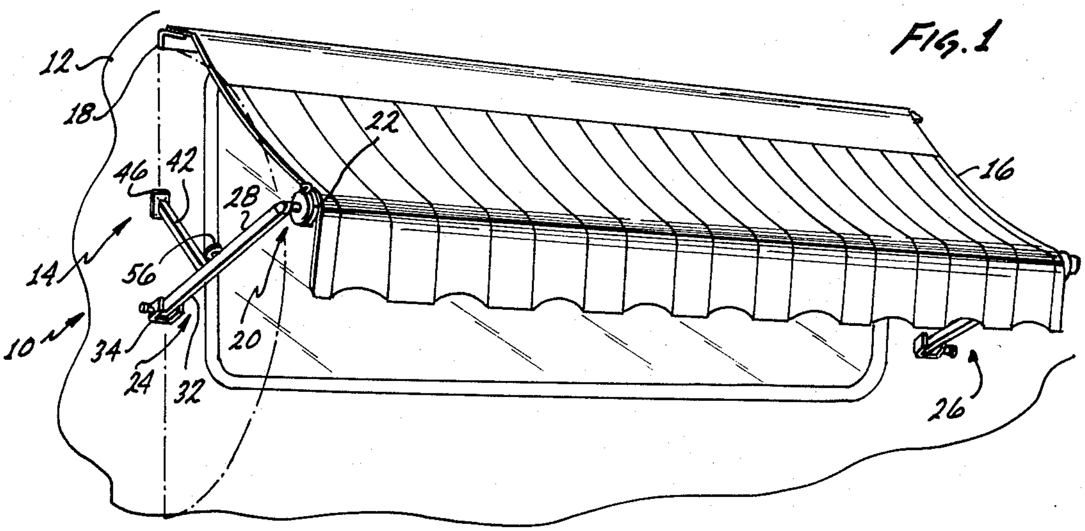
FIG. 1 is a perspective view of an awning assembly on a recreational vehicle and shows the awning assembly unwound from the recreational vehicle.

In one embodiment of the invention, a coach is generally indicated at 10 in FIG. 1. The coach is representatiave of a number of transportable dwellings such as trailer and motor homes and recreational vehicles, all being collectively designated in this application as "recreational vehicles". The recreational vehicle 10 has an exterior side surface 12 which has a generally vertical orientation with respect to the ground.

An awning assembly generally indicted at 14 is mounted on the side surface 12 of the recreational vehicle 10. It will be appreciated, however, that the awning assembly 14 can be mounted on any other exterior surface of the recreational vehicle 10 such as the front or rear surfaces of the recreational vehicle.

The awning assembly 14 includes a thin sheet of flexible material, such as a plastic or a canvas, forming an awning 16. The awning 16 preferably has a rectangular configuration. The awning 16 is preferably attached in a conventional manner at one end to an awning rail 18 which extends along the side surface 12 at an upper position on the side surface. The awning 16 is attached at its second end to a supporting structure generally indicated at 20.

In one embodiment of the invention, the supporting structure includes a roller 22 which is attached to the second end of the awning 16. The roller 22 is supported in generally parallel relationship to the surface 12 by a forward arm assembly generally indicated at 24 and by a rearward arm assembly generally indicated at 26. The arm assemblies 24 and 26 are similar to each other in a preferred form of the invention. Each of the arm assemblies 24 and 26 is disposed in a generally vertical plane.

The forward arm assembly 24 preferably includes a main support arm 28 which is longitudinal in configuration and is provided with a lower end 30 and an upper end 32. A lower mounting bracket 34 is pivotably connected to the lower end 30 of the main support 28. The bracket 34 is preferably mounted to the surface 12 of the recreational vehicle at a relatively low position on this side surface.

Figure 2:
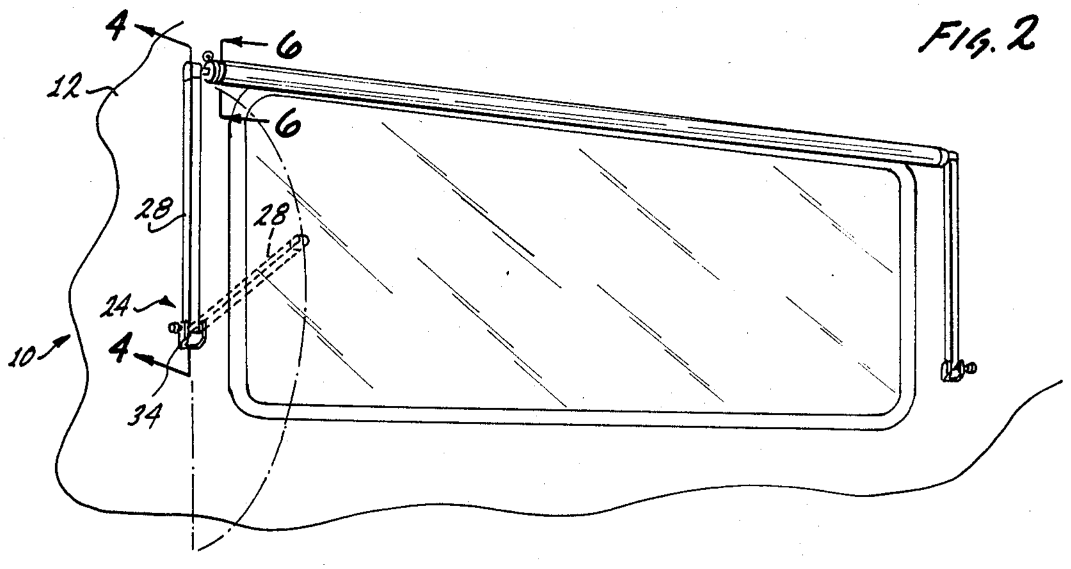
FIG. 2 is a perspective view of the awning assembly wound on the vehicle and illustrates in broken lines the arc described by support members for the awning in moving between the unwound and wound positions of the awning.
Figure 3:
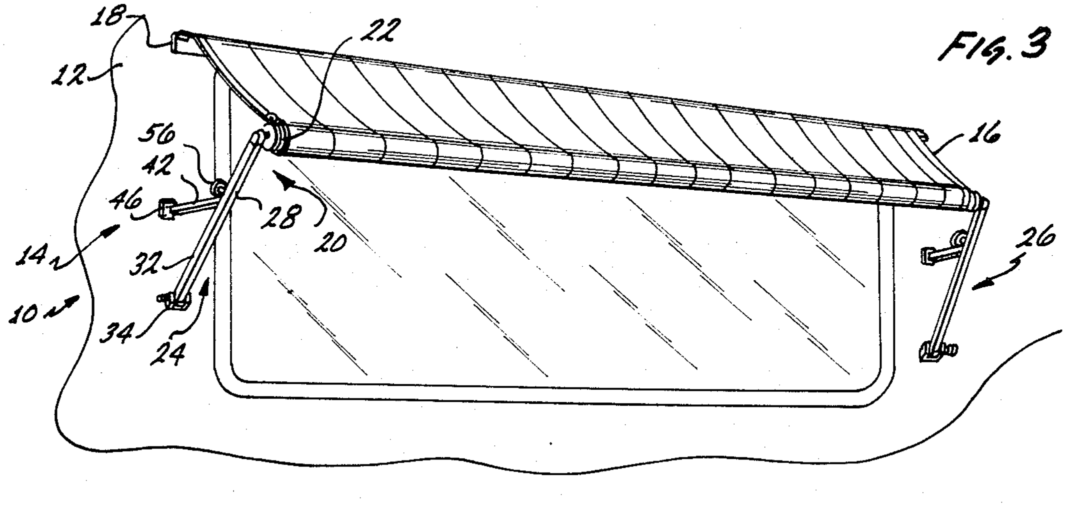
FIG. 3 is a perspective view of the awning assembly in a partially unwound relationship.

The awning assembly 14 is preferably operable to support the awning 16 in a compact configuration in close proximity to the side surface of the recreational vehicle 10 to facilitate movement or travel by the vehicle. This stored position of the awning assembly 14 is illustrated in FIG. 2. As will be seen in FIG. 2, the main support arm 28 has a generally parallel and snug relationship with respect to the side surface 12. This snug relationship is obtained because the awning 16 is rolled on the roller 22 in close proximity to the surface 12.

When a destination has been reached and it is desired to provide a shaded area adjacent to the recreational vehicle 10, the awning assembly can be deployed from the stored position to the extended position. This can be accomplished by unrolling the awning 16 from the roller 22 to extend in a generally planar configuration between the roller 22 and the awning rail 18. In the extended (or unwound) position shown in FIG. 1, the main support arm 28 has an angular relationship with the side surface 12 and the roller 22 has a spaced relationship with the side surface 12.

In the embodiment of the invention shown in the drawings, the roller 22 is spring biased as at 40 (FIG. 4) to rotate in a direction so that the awning 16 will be wound on the roller and the main support arm 28 will be pivoted toward the stored position. In order to oppose this pivotal movement, the forward arm assembly 24 may include a rafter arm 42 which extends between the side surface 12 and the upper end 34 of the main support arm 28. The rafter arm 42 is longitudinal in configuration and may be provided with an outer end and an inner end. The outer end of the rafter arm 40 may be coupled to the main support arm 28 and the inner end may be pivotally mounted to a mounting bracket 46 which may be disposed near the awning rail 18 in the preferred embodiment.

The position of the rafter arm 42 relative to the main support arm 28 can be maintained by tightening a knob 56.

The embodiment shown in the drawings includes apparatus constituting this invention for providing a controlled winding of the awning 14 on the roller 22. The apparatus includes a shaft 70 which extends through the roller 22 in concentric relationship with the roller and which supports the roller for rotation with the shaft. A cap generally indicated at 72 is also supported by the shaft 70 in a concentric relationship with the shaft. The cap 72 is defined by a disc portion 74 and a sleeve portion 76. The cap 72 is preferably open at the axial end opposite the disc portion 74.

A brake member 80 is suitably supported on the shaft 70 in concentric relationship within the shaft. The brake member 80 is suitably attached to the shaft 70 for rotation with the shaft and is preferably disposed within the sleeve portion 76. A coiled spring 82 is disposed around the annular periphery of the brake member 80 and is attached at its ends to a support member 84. The support member 84 is in turn disposed on a pin 86 which extends through the disc portion 74 at a position displaced from the center of the disc portion.

The pin 86 may be threaded at one end to receive a nut 88. The pin 86 is extended through a bearing portion 90 on the disc portion 74 to maintain the pin on the disc portion 74 without any wobbling of the pin. A lever arm 92 extends from the pin to facilitate a manual rotation of the pin. The lever arm 92 may be looped as at 94 so that a finger can be conveniently inserted in the loop. A control member such as an eccentric 96 is disposed on the pin 86 for rotary movement with the pin. The eccentric 96 is provided with dimensions so that its periphery is displaced from the inner periphery of the sleeve portion 76 in all of the rotary positions of the eccentric. The outer annular surface of the eccentric 94 may be knurled as at 98 to provide a friction contact with the brake member 80 when the eccentric has been rotated against the brake member.

Figures 4, 5:
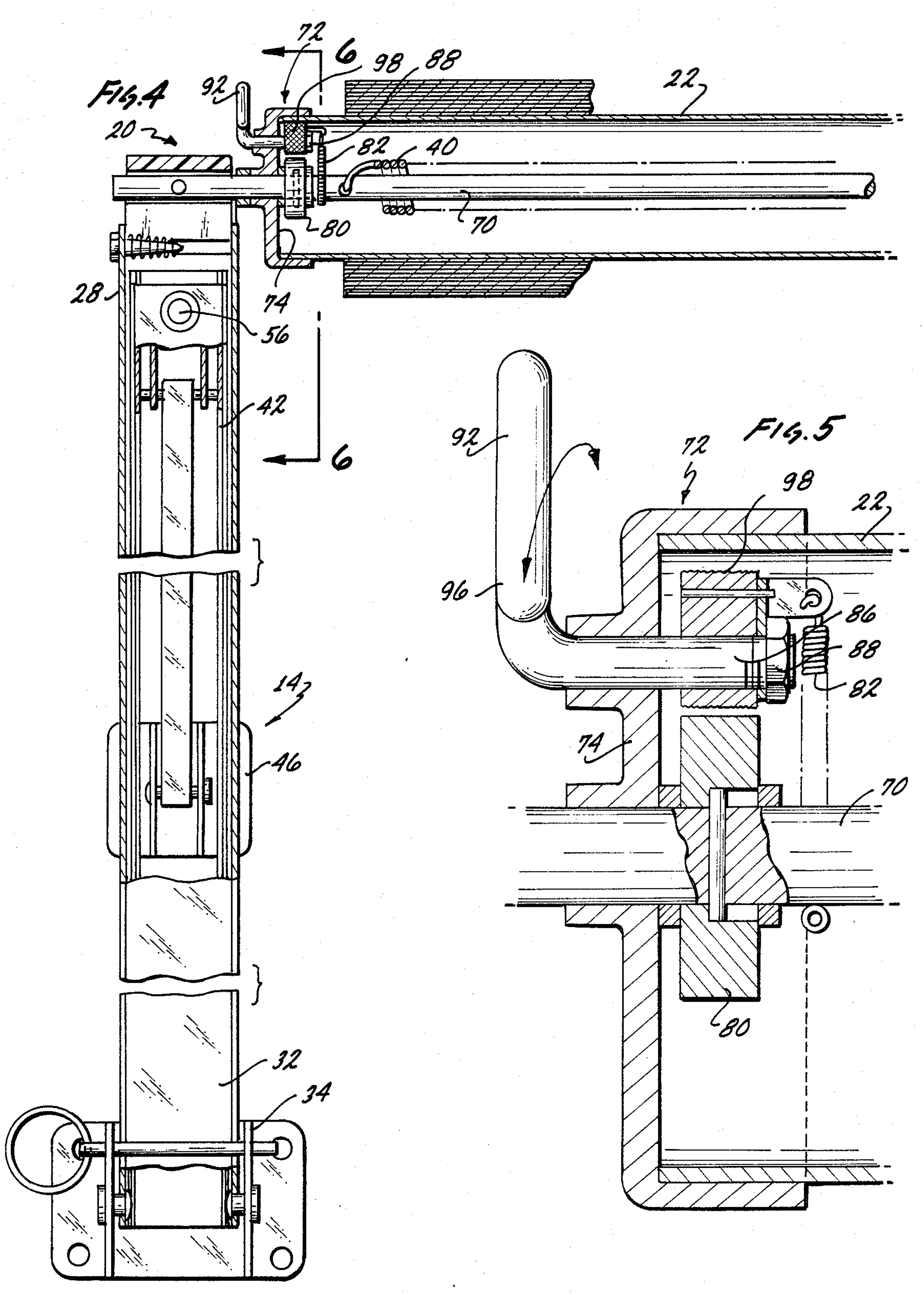
FIG. 4 is an elevational sectional view of the awning assembly and includes an arrangement for retaining the awning in the partially unwound position of FIG. 3.
FIG. 5 is an enlarged fragmentary sectional view, similar to that shown in FIG. 4, of the retaining arrangement shown in FIG. 4.
Figure 7:
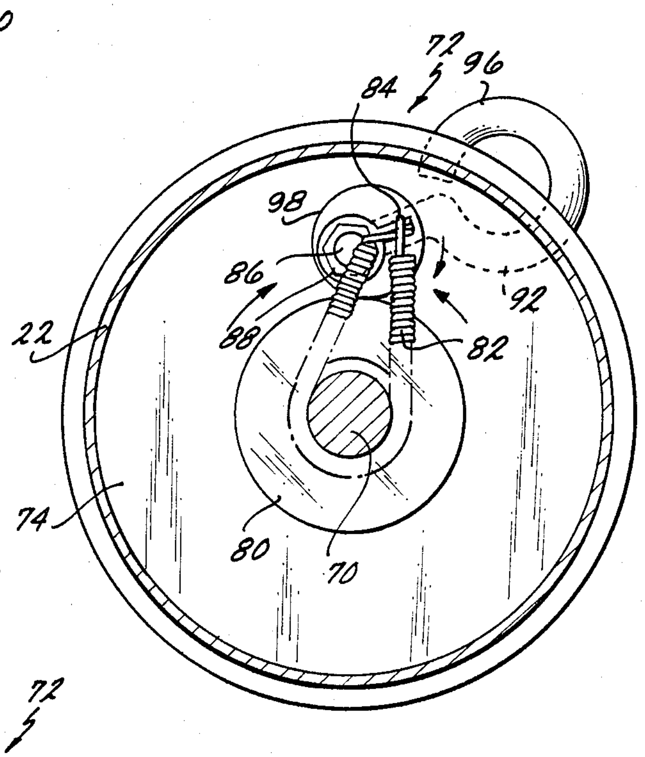
FIG. 7 is an enlarged fragmentary sectional view corresponding to that of FIG. 6 and illustrates the retaining arrangement in a second relationship.

The eccentric may be considered to have three (3) different rotary positions. To provide the first position, the eccentric 96 is rotated in a clockwise direction until the eccentric engages the brake member 80 as shown in FIG. 7. In this position, the brake member 80 is able to rotate in a clockwise direction until the eccentric engages the brake member 80 as shown in FIG. 5. In this position, the brake member 80 is able to rotate in a clockwise direction because it is acting on the eccentric in a direction to rotate the eccentric out of engagement with the brake member. The rotation of the brake member 80 in the clockwise direction provides for a winding of the awning 16 on the roller 22. However, the brake member 80 cannot be rotated in a counterclockwise direction because the brake member acts on the eccentric in a direction to bind the eccentric against the brake member. As a result, the awning cannot be unwound from the roller.

Figure 8:
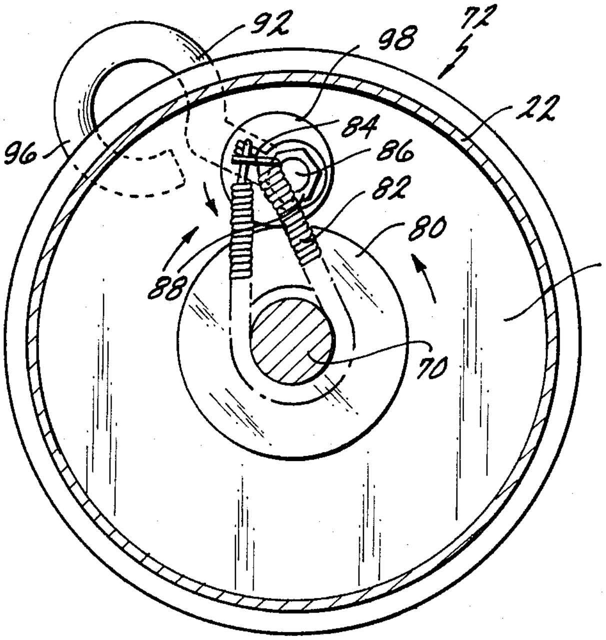
FIG. 8 is an enlarged fragmentary sectional view corresponding to that of FIG. 6 and illustrates the retaining arrangement in a third relationship.

To provide the second position, the eccentric 96 is rotated in a counterclockwise direction until the eccentric engages the brake member 80 as shown in FIG. 8. In this position, the brake member 80 is able to rotate in a counterclockwise direction because the brake member acts on the eccentric in a direction for moving the eccentric out of engagement with the brake member. The rotation of the brake member 80 in the counterclockwise direction provides for an unwinding of the awning 16 from the roller 22. However, the brake member 80 cannot be rotated in a counterclockwise direction because the brake member acts on the eccentric 96 in a direction to bind the eccentric against the brake member. This prevents the awning 16 from being wound on the roller.

Figure 6:
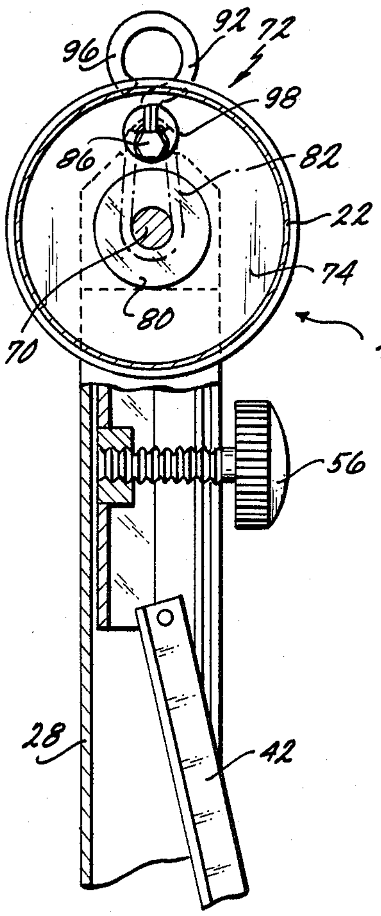
FIG. 6 is an enlarged fragmentary sectional view taken substantially on the line 6—6 of FIG. 4 and illustrates the retaining arrangement in a first relationship.

The third position of the eccentric 94 is shown in FIG. 6. In this position, the eccentric 96 does not engage the brake member 80. The eccentric 94 also does not engage the wall of the sleeve portion 76 on the cap 72. This provides for a free rotation of the shaft 70, the cap 72 and the roller 22 in either a direction for winding the awning 16 on the roller or unwinding the awning from the roller 22.

As will be seen, the constraint of the spring 82 is somewhat relaxed when the eccentric 96 is in the first position shown in FIG. 7 or in the second position shown in FIG. 8. This provides for a retention of the eccentric 96 in the particular one of the first and second positions to which it has been manually rotated. In the third position of the eccentric 96 as shown in FIG. 6, the spring 82 is more constrained than in the first and second positions. However, in the third position of the eccentric 96, the spring 82 is aligned radially and symmetrically with the brake member 80 and the eccentric. This provides for a retention of the eccentric 96 in the third position so that the shaft 70, the cap 72 and the roller 22 can be freely rotated in either direction.

The invention disclosed above has certain important advantages. It provides a simple and reliable apparatus for locking the awning 16 to any desired position relative to the side surface 12 of the recreational vehicle 10. It also insures that the awning can be freely moved in one rotary direction by a single occupant of the recreational vehicle without any great exertion or fuss by such occupant and locked against movement in the other direction.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In combination for use on a recreational vehicle,
a roller,
an awning having first and second opposite ends and attached at one end to the recreational vehicle and attached at the second end to the roller,
a hollow cap rotatable with the roller,
a brake member disposed within the cap and coupled to the cap for rotation with the roller, and
an eccentric coupled to the cap for rotation with the cap and rotatable relative to the cap in two opposite directions for engagement with the brake member after rotation in each of the two opposite directions to provide for an unwinding of the awning from the roller, and to inhibit a winding of the awning on the roller, with the engagement between the eccentric and the brake member after the rotation of the eccentric in the first direction and to provide for a winding of the awning on the roller, and to inhibit an unwinding of the awning from the roller, with the engagement between the eccentric and the brake member after the rotation of the eccentric in the second direction.

2. The combination set forth in claim 1 wherein
the brake member is concentrically mounted on the cap and the eccentric is eccentrically mounted on the cap.

3. The combination set forth in claim 1 wherein
a lever arm is attached to the eccentric to facilitate a rotation of the eccentric in each of the two opposite directions.

4. The combination set forth in claim 1 wherein
the brake member is disposed on a shaft and a spring is wound in a closed loop around the shaft and the eccentric.

5. The combination set forth in claim 1 wherein
the eccentric is rotatable to a third position in displaced relationship from the brake member to provide for a free rotation of the shaft, the roller and the cap in the first and second opposite directions.

6. In combination for use in a recreational vehicle,
a rotary shaft,
a roller mounted on the shaft in concentric relationship with the shaft for rotation with the shaft,
an annular cap disposed on the shaft at one end of the shaft in concentric relationship with the shaft,
a brake member disposed on the shaft in concentric relationship with the shaft for rotation with the shaft, and
a control member disposed on the cap in eccentric relationship with the cap and movable to first and second positions, the control member being disposed in the first position in cooperative relationship with the brake member to provide for a rotation of the brake member in the first rotary direction and an inhibition of the brake member against rotation in the second direction and being disposed in the second position in cooperative relationship with the brake member to provide for a rotation of the brake member in the second rotary direction and an inhibition of the brake member against rotation in the first direction, and
an awning attached at one end to the recreational vehicle and at the second end to the roller for winding on the roller in accordance with the rotation of the roller and the brake member in the first direction and for unwinding from the roller in accordance with the rotation of the roller and the brake member in the second direction.

7. The combination set forth in claim 6 wherein
the control member is also movable to a third position between the first and second positions and is disposed relative to the brake member in the third position to provide for a rotation of the cap, the roller and the brake member in the first and second opposite directions.

8. The combination set forth in claim 7 wherein
a spring is operatively coupled to the brake member and the control member to oppose the movement of the control member from the third position to either of the first and second positions.

9. The combination set forth in claim 8 wherein the control member is an eccentric mounted in an eccentric position on the cap and the eccentric and the brake member define a radial relationship in the third position and a spring is disposed around the brake member and the eccentric and is relatively constrained in the third position of the eccentric and is relatively relaxed in the first and second positions of the eccentric.

10. The combination set forth in claim 9 wherein the control member is movable to a third position in displaced relationship from the brake member to provide for a free rotation of the shaft, the roller and the cap in the first and second opposite directions.

11. In combination for use with an awning on a recreational vehicle to provide for a controlled positioning of the awning relative to the vehicle, a cap having a disc portion and a cylindrical wall extending from the outer periphery of the disc portion and defining an opening at the end opposite the disc portion, a rotary shaft extending through the disc portion of the cap at the center of the disc portion for rotating the cap, a roller mounted on the shaft in concentric relationship with the cap for rotating with the shaft and for winding or unwinding the awning in accordance with the direction of rotation of the roller, a brake member mounted on the shaft in concentric relationship with the shaft for rotating with the shaft, and an eccentric mounted on the disc portion of the cap in offset relationship to the shaft, the eccentric having first, second and third rotary positions, the eccentric being disposed relative to the brake member for separation from the cylindrical wall of the cap in the first, second and third positions of the eccentric and from the brake member in the first position of the eccentric and for engagement with the brake member in the second position of the brake member to prevent the brake member from rotating in a direction providing for the unwinding of the awning from the roller and for engagement with the brake member in the third position of the brake member to prevent the brake member from rotating in a direction providing for the winding of the awning on the roller.

12. The combination set forth in claim 11, including, constrainable means disposed in cooperative relationship with the brake member and the eccentric and providing a constraint with the positioning of the eccentric in the first position and for providing for a relaxation of such constraint with the positioning of the eccentric in the second and third positions.

13. The combination set forth in claim 12, including, a lever arm operatively coupled to the eccentric to provide for a rotation of the eccentric to the first, second and third positions and the constrainable means constituting a spring extending around the eccentric and brake member.

* * * * *